United States Patent [19]
Muraki et al.

[11] Patent Number: 5,951,956
[45] Date of Patent: *Sep. 14, 1999

[54] CATALYST FOR PURIFYING EXHAUST GAS AND METHOD FOR PURIFYING EXHAUST GAS

[75] Inventors: Hideaki Muraki; Motohisa Saiki; Mariko Adachi; Shinichi Matsumoto, all of Aichi; Takaaki Kanazawa, Toyota; Kenji Katoh, Sunto-gun; Satoshi Iguchi, Mishima; Tetsuro Kihara, Susono; Syuji Tateishi; Koichi Kasahara, both of Ogasa-gun, all of Japan

[73] Assignees: Kabushiki Kaisha Toyota Chuo Kenkyusho, Aichi; Toyota Jidosha Kabushiki Kaisha, Toyota; Cataler Industrial Co. Ltd., Shizuoka, all of Japan

[*] Notice: This patent issued on a continued prosecution application filed under 37 CFR 1.53(d), and is subject to the twenty year patent term provisions of 35 U.S.C. 154(a)(2).

[21] Appl. No.: 08/391,841

[22] Filed: Feb. 17, 1995

Related U.S. Application Data

[63] Continuation of application No. 08/034,898, Mar. 19, 1993, abandoned.

[30] Foreign Application Priority Data

Mar. 23, 1992 [JP] Japan .................................. 4-097005

[51] Int. Cl.$^6$ .................................................. B01D 53/68
[52] U.S. Cl. ..................................... 423/213.5; 423/213.2
[58] Field of Search ..................... 423/263, 593, 423/213.5, 213.2

[56] References Cited

U.S. PATENT DOCUMENTS

| | | |
|---|---|---|
| 4,624,940 | 11/1986 | Wan et al. . |
| 4,808,564 | 2/1989 | Matsumoto ............................. 502/303 |
| 4,843,056 | 6/1989 | Matsumoto et al. .................... 502/303 |
| 4,849,398 | 7/1989 | Takada et al. . |
| 5,063,192 | 11/1991 | Murakami et al. ..................... 502/303 |
| 5,075,275 | 12/1991 | Murakami et al. ..................... 502/303 |
| 5,185,305 | 2/1993 | Subramanian et al. .............. 423/213.5 |
| 5,208,205 | 5/1993 | Subramanian ....................... 423/213.5 |

FOREIGN PATENT DOCUMENTS

| | | |
|---|---|---|
| 37 13 629 | 10/1987 | Germany . |
| 37 26 580 | 3/1988 | Germany . |
| 6111127 | 5/1986 | Japan . |
| 62254843 | 6/1986 | Japan . |
| 61181538 | 8/1986 | Japan . |
| 62117620 | 5/1987 | Japan . |
| 1-030641 | 2/1989 | Japan ................................. 423/213.5 |
| 1-307432 | 12/1989 | Japan ................................. 423/213.5 |
| 2-149346 | 6/1990 | Japan . |
| 3-068451 | 3/1991 | Japan . |
| 4-27532 | 1/1992 | Japan .................................... 502/303 |
| WO 91/08827 | 6/1991 | WIPO . |
| WO 92/10271 | 6/1992 | WIPO . |

OTHER PUBLICATIONS

Translation of JP–62–106826 (Koichi Saito, et al.), First published 1989.

Yamashita, H, et al. "Oxidative Coupling of Methane with Peroxide Ions over Barium–Lanthanum–Oxygen Mixed Oxide", Applied Catalysis A:General, vol. 79, pp. 203–214 (1991).

Official Translation of Japanese Kokai 03–068,451, Mar. 1991.

*Primary Examiner*—Wayne Langel
*Assistant Examiner*—Peter DiMauro
*Attorney, Agent, or Firm*—Oblon, Spivak, McClelland, Maier & Neustadt, P.C.

[57] ABSTRACT

A catalyst for purifying an exhaust gas for simultaneously removing carbon monoxide, hydrocarbons and nitrogen oxides contained in the exhaust gas under an oxygen rich atmosphere, comprising a carrier composed of a porous material, and barium oxide, lanthanum oxide and platinum supported on the carrier, and a method for purifying an exhaust gas by bringing the exhaust gas under an oxygen rich atmosphere into contact with the above-mentioned catalyst.

6 Claims, No Drawings

CATALYST FOR PURIFYING EXHAUST GAS AND METHOD FOR PURIFYING EXHAUST GAS

This application is a continuation of application Ser. No. 08/034,898, filed on Mar. 19, 1993, now abandoned.

BACKGROUND OF THE INVENTION

1. Field of the Invention

The present invention relates to a catalyst for purifying an exhaust gas and a method for purifying an exhaust gas. More specifically, it relates to a catalyst for purifying an exhaust gas and a method for purifying an exhaust gas which can effectively remove nitrogen oxides (NOx) from an exhaust gas under an oxygen rich atmosphere, that is, an exhaust gas having an oxygen content larger than that necessary for completely oxidizing reducible substances contained in an exhaust gas, such as carbon monoxide, hydrogen and hydrocarbons i.e., larger than a stoichimetrical air-fuel ratio.

2. Description of the Related Art

Many three-way catalysts for purifying an exhaust gas are known as a catalyst for purifying an exhaust gas discharged from automobiles. These three-way catalysts are capable of oxidizing carbon monoxide (CO) and hydrocarbons (HC) contained in an exhaust gas and simultaneously reducing nitrogen oxides (NOx) co-existing in the exhaust gas. Typical examples of this type of catalyst include a catalyst prepared by coating a γ-alumina slurry on a heat-resistant carrier, such as cordierite, calcining the coated carrier and supporting noble metals, such as Pd, Pt and Rh, on the carrier.

The performance of these catalysts for purifying an exhaust gas is greatly influenced by the set air-fuel ratio of engines. Particularly, the oxygen content of the exhaust gas after burning becomes large in a lean mixture, that is, on the lean side having a large air-fuel ratio, so that the oxidation process becomes active while the reduction process becomes inactive. On the other hand, on the rich side having a small air-fuel ratio, the oxygen content of the exhaust gas after burning becomes so small that the oxidation process becomes inactive, while the reduction process becomes active.

On the other hand, in recent years, energy saving is required from the viewpoint of resource problems and an increase in the temperature of the earth, which has led to a strong demand for lowering the fuel consumption of automobiles. In the gasoline engine, lean burn has attracted attention from the viewpoint of efficient burning. In the lean burn, the burning during ordinary running of automobiles is effected on the lean side as much as possible, wherein an oxygen-rich air-fuel mixture is burned. For this reason, the development of a catalyst, which can sufficiently remove NOx even on the lean side, has been desired in the art.

Accordingly, in order to solve the above-mentioned problems, various catalysts for purifying an exhaust gas have been proposed as a catalyst for purifying an exhaust gas discharged from automobiles under the above-mentioned oxygen rich atmosphere, wherein the oxidation of carbon monoxide, hydrocarbons, etc., and the reduction of nitrogen oxides are simultaneously effected.

For example, a proposal has been made regarding a $Pt/Al_2O_3$ catalyst comprising an alumina carrier and platinum supported on the carrier, which catalyst is simultaneously capable of oxidizing carbon monoxide and hydrocarbons and of reducing nitrogen oxides.

We have previously proposed "Method for Purifying Exhaust Gas" wherein an oxygen rich exhaust gas is brought into contact with a catalyst comprising a porous material and, supported thereon, platinum and lanthanum (see Japanese Patent Application No. 3-344781).

In the former $Pt/Al_2O_3$ catalyst, however, the conversion of NOx under an oxygen rich atmosphere is at most 20 to 30% (air-fuel ratio: A/F=about 22 to 23) even when the amount of the supported platinum is increased, and therefore, it has a problem that the conversion of NOx is unsatisfactory for practical use of the catalyst.

On the other hand, the latter catalyst disclosed in Japanese Patent Application No. 3-344781 can enhance the activity for reacting hydrocarbons with NOx by virtue of the addition of lanthanum to the catalyst to improve the transient properties in the transition: of the lean region→the stoichiometrical region→the lean region, and further can improve the conversion of NOx at the time of acceleration and deceleration through the utilization of the capability of lanthanum oxide to adsorb NOx. However, the effect obtained by the use of lanthanum is still unsatisfactory. Further, there is a problem in this catalyst that lanthanum may deteriorate the durability of the catalyst.

SUMMARY OF THE INVENTION

Accordingly, the objects of the present invention are to eliminate the above-mentioned problems of the prior art and to provide a catalyst for purifying an exhaust gas and a method for purifying an exhaust gas which can convert carbon monoxide, hydrocarbons and nitrogen oxides contained in an exhaust gas with a high efficiency under an oxygen-rich atmosphere.

Another object of the present invention is to provide a catalyst for purifying an exhaust gas and a method for purifying an exhaust gas which can realize simultaneous conversion of NOx, CO and hydrocarbons with a high efficiency in such a state as in running of lean burn type automobiles wherein the composition of an exhaust gas frequently varies in the range of from around stoichiometrical air-fuel ratio to overlean state (A/F=about 23).

Other objects and advantages of the present invention will be apparent from the following description.

In accordance with the present invention, there is provided a catalyst for purifying an exhaust gas for simultaneously removing carbon monoxide, hydrocarbons and nitrogen oxides contained in the exhaust gas under an oxygen rich atmosphere, comprising a carrier composed of a porous material, and barium oxide, lanthanum oxide and platinum supported on said carrier, wherein at least part of the barium oxide and at least part of the lanthanum oxide form a composite oxide.

In accordance with the present invention, there is also provided a method for purifying an exhaust gas for simultaneously removing carbon monoxide, hydrocarbons and nitrogen oxides contained in the exhaust gas under an oxygen rich atmosphere, wherein the exhaust gas under an oxygen-rich atmosphere is brought into contact with the above-mentioned catalyst for purifying an exhaust gas.

DESCRIPTION OF THE PREFERRED EMBODIMENTS

The present inventors have found that, although an oxidation catalyst comprising alumina and a catalyst component supported thereon is known as a catalyst for effectively converting CO and hydrocarbons, this oxidation catalyst allows the oxygen content of the exhaust gas, after burning, to become high, on the overlean side having a high air-fuel ratio, and therefore, the reducing action becomes inactive. On the other hand, the catalyst as disclosed in the above-mentioned Japanese Patent Application No. 3-344781 wherein a lanthanum element is included as a catalyst component, there is a fear of lowering the durability of the catalyst per se although it has the effect of improving the purifying efficiency of nitrogen oxides.

In view of the above-mentioned facts, the present inventors have found that, in order to improve the purification efficiency and durability of the catalyst containing a lanthanum element, it is necessary to attain (a) the prevention of a reaction of lanthanum with alumina, (b) the increase in the dispersibility and electronic interaction of platinum and (c) the prevention of the grain growth of platinum.

Further, the present inventors have given their attention to the simultaneous presence of barium and lanthanum as additives in the catalyst and, as a result, have found that this enables the catalyst to simultaneously purify the NOx, CO and hydrocarbons contained in the exhaust gas with a high efficiency under an oxygen rich atmosphere or under such a working condition that the gas composition frequently varies in the range of from around the stoichiometrical air-fuel ratio to overlean state (A/F=about 23).

Although the mechanism through which the catalyst for purifying an exhaust gas according to the first invention and the method for purifying an exhaust gas according to the second invention provide excellent effects has not been elucidated yet, it is believed as follows.

The catalyst for purifying an exhaust gas according to the present invention comprises a carrier composed of a porous material and barium oxide, lanthanum oxide and platinum supported on said carrier. The barium oxide and lanthanum oxide partly combines with each other to form a composite oxide ($BaLa_2O_4$). This composite oxide prevents the formation of $LaAlO_3$, which is one of the causes of the deterioration of the catalyst, and further prevents the grain growth of platinum. Further, it is believed that a mixture of barium oxide (BaO) with lanthanum oxide ($La_2O_3$) contributes to an improvement in the catalytic activity.

It is considered that, by virtue of the above-mentioned functions, the catalyst for purifying an exhaust gas according to the present invention can realize simultaneous purification of carbon monoxide, hydrocarbons and nitrogen oxides with a high efficiency even under an oxygen rich atmosphere. Further, it is also considered that the catalyst for purifying an exhaust gas according to the present invention can realize simultaneous purification of NOx, CO and hydrocarbons with a high efficiency under such a working condition as in running of automobiles equipped with a lean burn engine, wherein the composition of the exhaust gas frequently varies in the range of from around stoichiometrical air-fuel ratio to overlean state (A/F=about 23).

In the method for purifying an exhaust gas according to the present invention, when a catalyst for purifying an exhaust gas comprising a carrier composed of a porous material and barium oxide, lanthanum oxide and platinum, supported on the carrier is provided within an oxygen rich exhaust gas atmosphere containing carbon monoxide, hydrocarbons and nitrogen oxides, NOx adsorbed on platinum is decomposed and released as $N_2$. Specifically, the barium oxide and lanthanum oxide have an effect on the electronic state of platinum to accelerate the dissociation of the NOx adsorbed on platinum and, at the same time, to accelerate the desorption as $N_2$.

It is considered that, by virtue of the above functions, the catalyst for purifying an exhaust gas according to the present invention can realize simultaneous purification of carbon monoxide, hydrocarbons and nitrogen oxides with a high efficiency even under an oxygen rich atmosphere.

Further, when the catalyst for purifying an exhaust gas is provided under such a working condition as in running of automobiles equipped with a lean burn engine wherein the gas composition of the exhaust gas frequently varies in the range of from around stoichiometrical air-fuel ratio to overlean state (A/F=about 23), the NOx adsorbed on platinum is partly decomposed and released as $N_2$. The remaining NOx is spilled over a mixture of the barium oxide and the lanthanum oxide and adsorbed into the oxides. When the composition of the exhaust gas atmosphere becomes around the stoichiometrical air-fuel ratio at the time of acceleration and deceleration of vehicles, the adsorbed NOx is reacted with reducing agents, such as CO, hydrocarbons and $H_2$, and released as $N_2$. In the oxygen rich region, CO and hydrocarbons are easily oxidized by the catalyst of the present invention.

It is considered that, by virtue of the above functions, the catalyst for purifying an exhaust gas according to the present invention can realize simultaneous purification of NOx, CO and hydrocarbons with a high efficiency under such a working condition as in running of automobiles equipped with a lean burn engine, wherein the gas composition of the exhaust gas frequently varies in the range of from around stoichiometrical air-fuel ratio to overlean state (A/F=about 23).

The catalyst for purifying an exhaust gas according to the first invention can realize simultaneous purification of carbon monoxide, hydrocarbons and nitrogen oxides contained in an exhaust gas with a high efficiency under an oxygen rich atmosphere.

Further, it can realize simultaneous purification of NOx, CO and hydrocarbons with a high efficiency under such a working condition as in running of automobiles equipped with a lean burn engine wherein the gas composition of the exhaust gas frequently varies in the range of from around stoichiometrical air-fuel ratio to overlean state (A/F=about 23).

The method for purifying an exhaust gas according to the second invention can realize simultaneous purification of carbon monoxide, hydrocarbons and nitrogen oxides contained in an exhaust gas with a high efficiency even under an oxygen rich atmosphere.

Further, it can realize simultaneous purification of NOx, CO and hydrocarbons with a high efficiency under such a working condition as in running of lean burn automobiles wherein the gas composition of the exhaust gas frequently varies in the range of from around a stoichiometrical air-fuel ratio to overlean state (A/F=about 23).

The catalyst for purifying an exhaust gas according to the first invention and the method for purifying an exhaust gas according to the second invention will now be described in more detail.

The carrier usable in the present invention is a porous material, and specific examples thereof include alumina, zeolite, zirconia, silica-alumina and silica. There is no particular limitation on the kinds and properties of these porous carriers, and use may be made of any porous material conventionally used as a carrier for catalysts in the art. Further, these porous materials may be used after they are coated on a monolith comprising cordierite, a heat-resistant metal alloy or the like.

The use of alumina as the carrier is preferred, because it offers the effect of maintaining a high surface area up to a relatively high temperature and, at the same time, preventing the grain growth of platinum, barium oxide and lanthanum oxide. Further, the use of zeolite as the carrier can advantageously maintain platinum in a better dispersed state and provide an excellent capability of adsorbing the hydrocarbons.

The active metal supported on the carrier according to the present invention comprises barium oxide, lanthanum oxide and platinum.

Among these metals, lanthanum is preferably supported in an amount of 0.05 to 10.0 mol/L, more preferably 0.1 to 0.1 mol/L, of the catalyst. When the amount of lanthanum supported is less than 0.05 mol/L, there is a possibility that the NOx adsorption effect is unsatisfactory. On the other hand, when the amount of lanthanum exceeds 10.0 mol/L, there is a possibility that the surface area of the carrier will be lowered.

The amount of the barium supported is preferably 0.05 to 10.0 mol/L, more preferably 0.1 to 0.1 mol/L, of the catalyst. When the amount of the barium is less than 0.05 mol/L, there is a possibility that the NOx adsorption effect is unsatisfactory. On the other hand, when the amount of the barium exceeds 10.0 mol/L, the surface area of the carrier will be lowered.

The total amount of the lanthanum and barium supported is preferably 0.05 to 10.0 mol/L. When the total supported amount is less than 0.05 mol/L, there is a possibility that the NOx adsorption effect is unsatisfactory. On the other hand, when the total supported amount exceeds 10.0 mol/L, there is a possibility that the surface area of the carrier will be lowered. The total amount is particularly preferably 0.1 to 1.0 mol/L, because the effect of the present invention can be more effectively exhibited.

The amount of the platinum supported is preferably 0.1 to 10.0 g/L. When the amount of platinum supported is less than 0.1 g/L, there is a possibility that the catalytic activity is unsatisfactory. On the other hand, when the supported amount exceeds 10.0 g/L, the grain growth of platinum is accelerated, so that no significant additional improvement corresponding to the supported amount can be attained, which disadvantageously leads to an increase in the cost. The supported amount is particularly preferably 0.5 to 3.0 g/L from the viewpoint of the activity and cost.

The active metal comprising platinum, lanthanum and barium is supported in the following manner. Platinum is highly dispersed near and among the mutually highly dispersed elements comprising a composite oxide ($BaLa_2O_4$), and optionally, the lanthanum oxide and/or the barium oxide.

In the catalyst for purifying an exhaust gas according to the present invention, the above-mentioned mixture of platinum with lanthanum and barium is supported as the active metal on the above-mentioned carrier. There is no particular limitation on the method for producing such a catalyst for purifying an exhaust gas, and use may be made of any method commonly used in the art. A specific example thereof will now be described.

Specifically, a monolithic honeycomb base material comprising cordierite is wash-coated with activated alumina by a conventional method (which comprises immersing the base material into a slurry prepared by mixing activated alumina and alumina sol into water, taking out the base material from the slurry, blowing off excess slurry with compressed air, drying the coated base material at 200° C. and then calcining the coated base material at 600° C.); immersed in an aqueous mixed solution comprising lanthanum nitrate and barium nitrate and taken out from the mixed solution; after the excess aqueous solution is blown off, dried and calcined. Thereafter, the calcined material is immersed in an aqueous solution of dinitrodiamineplatinum etc., to support platinum on the calcined material, and then dried and calcined to provide the catalyst of the present invention.

In the method for purifying an exhaust gas according to the present invention, carbon monoxide, hydrocarbons and nitrogen oxides contained in an exhaust gas under an oxygen rich atmosphere can be simultaneously purified by bringing an oxygen rich exhaust gas into contact with the above-mentioned catalyst for purifying an exhaust gas comprising a carrier composed of a porous material and barium oxide, lanthanum oxide and platinum, supported on the carrier. In this case, there is no particular limitation on the method of bringing the catalyst into contact with the exhaust gas. Further, there is no particular limitation also on the place in the path of the exhaust gas where the above-mentioned catalyst is provided. However, in the case of an exhaust path for a lean burn engine, for example, it is preferred for the catalyst to be provided under the floor of vehicles, under the floor on the downstream side of a starting catalyst or a three-way catalyst or other place.

Thus, the use of the catalyst for purifying an exhaust gas and the method for purifying an exhaust gas according to the present invention enables CO, hydrocarbons and NOx in an exhaust gas discharged from vehicles equipped with a lean burn engine to be purified with a high efficiency during steady running (for example, 40 km/hr) and in a transient state (for example, an urban running simulated state).

The catalyst of the present invention and the catalyst used in the method of the present invention act according to the change in the composition of the exhaust gas discharged from an engine during running of vehicles in the following manner.

When vehicles are stopped, the A/F value becomes close to the stoichiometrical A/F value, so that the NOx content of the exhaust gas is low. In this case, on the catalyst, NOx adsorbed into a mixture of BaO with $La_2O_3$ migrates towards Pt (i.e., reversely spilled over) and reacts with reducing gases (CO, $H_2$ and hydrocarbons) contained in the exhaust gas and, as a result, NOx is reduced to $N_2$.

At the time of the acceleration of vehicles, the A/F value continuously changes from around the stoichiometrical A/F value to lean state (A/F=about 23). At that time, part of NOx is reduced on platinum, and the remaining NOx is spilled over and adsorbed into the mixture of BaO with $La_2O_3$. When the air-fuel ratio has become close to the stoichiometrical value, the adsorbed NOx is reduced with reducing gases to $N_2$.

During steady running, the A/F value is in a lean (A/F= about 23) region, where the NOx content of the exhaust gas is lower than that at the time of acceleration while the HC content is somewhat higher than that at the time of acceleration. At that time, NOx is reduced with hydrocarbons to $N_2$. The NOx remaining unreacted is adsorbed into the mixed oxide.

Therefore, during running mode of vehicles for running in an urban area where the driving pattern comprises a combination of the above-mentioned patterns, the NOx emission can be reduced by the catalyst of the present invention. With respect to hydrocarbons and CO, since the catalyst of the present invention has a very excellent oxidation capability, a high conversion performance can be attained in an oxygen rich atmosphere or around a stoichiometrical air-fuel ratio.

The present invention will now be further described by, but is by no means limited to, the following Examples.

EXAMPLE 1

Monolithic catalysts comprising Pt/barium-lanthanum mixed oxide/alumina having the varying supported amount were prepared and subjected to a performance evaluation test.

At the outset, 70 parts by weight (hereinafter referred to as "parts" unless otherwise specified) of alumina sol (alumina content: 10% by weight), 15 parts of a 40 wt.% aqueous aluminum nitrate solution and 30 parts of water were added and mixed with 100 parts of an activated alumina powder while stirring to provide a coating slurry.

A previously prepared cordierite monolithic honeycomb carrier was immersed in water and taken out of water, and excess water was blown off. Thereafter, the carrier was immersed in the slurry prepared above and taken out of the slurry, and excess slurry was blown off. The coated carrier was dried at 200° C. for 20 min and further calcined at 600° C. for one hour. In the calcined product, the coverage of alumina was 120 g per liter of the monolith.

Then, the alumina-coated carrier was immersed in an aqueous lanthanum nitrate solution having a predetermined concentration, dried and calcined at 700° C. for one hour to provide a monolith wherein the amount of supported La was as given in Table 1.

TABLE 1

| Sample | | Prepared Catalyst Amount Supported | | |
|---|---|---|---|---|
| No. | | Ba (mol/L) | La (mol/L) | Pt (g/L) |
| Ex. of | 1 | 0.15 | 0.1 | 2.0 |
| Inven- | 2 | 0.1 | 0.2 | 2.0 |
| tion | 3 | 0.05 | 0.3 | 2.0 |
| Comp. | C1 | 0.0 | 0.0 | 2.0 |
| Ex. | C2 | 0.0 | 0.4 | 2.0 |

Then, the monolith having La supported thereon was immersed in an aqueous barium acetate solution having a predetermined concentration for 30 sec and calcined at 600° C. for one hour to provide a monolith wherein the amount of Ba supported was as given in Table 1.

Then, the monolith was immersed in an aqueous dinitrodiamineplatinum nitrate solution, dried and then calcined at 300° C. for one hour to provide the catalyst for purifying an exhaust gas according to the example of the present invention wherein the amount of Pt supported was as given in Table 1.

The catalysts for purifying an exhaust gas thus prepared were brought into contact with an oxygen rich exhaust gas to evaluate the performance with respect to the purification of carbon monoxide, hydrocarbons and nitrogen oxides contained in an exhaust gas under an oxygen rich atmosphere. The performance was evaluated by a purification performance measuring test in a steady state and a transient state.

At the outset, a purification performance test was effected in a steady state. The above-mentioned catalyst (1.3 liters) was provided in an exhaust path of a lean burn engine (1.6 liters) at a position of 1.6 m downstream of an exhaust manifold. The engine was driven under a condition of an A/F value of 22, and the output of the engine was regulated so that the temperature on the inlet side of the catalyst became 275° C. Then, the purification efficiencies of CO, Hc and NOx under this condition were determined by measuring gas concentrations before and behind the catalyst with an exhaust gas analyzer. The results are given in Table 2.

TABLE 2

Results of Performance Evaluation Test (Evaluation Test on Exhaust Gas Purification Performance)

| | Sample No. | | Steady State Purification Efficiency (%) | | | Transient State NOx Purifycation efficiency |
|---|---|---|---|---|---|---|
| | | | NOx | HC | CO | (%) |
| Ex. 1 | 1 | Initial State | 40 | 85 | 86 | 93 |
| | | After Exposure to Durability Test Conditions | 32 | 82 | 81 | 78 |
| | 2 | Initial State | 45 | 85 | 85 | 95 |
| | | After Exposure to Durability Test Conditions | 39 | 81 | 79 | 81 |
| | 3 | Initial State | 39 | 86 | 88 | 90 |
| | | After Exposure to Durability Test Conditions | 31 | 80 | 82 | 75 |
| Comp. Ex. | c1 | Initial State | 37 | 84 | 85 | 85 |
| | | After Exposure to Durability Test Conditions | 21 | 81 | 81 | 32 |
| | c2 | Initial State | 32 | 84 | 86 | 83 |
| | | After Exposure to Durability Test Conditions | 20 | 79 | 80 | 41 |
| Ex. 2 | | Initial State | 39 | 86 | 87 | 92 |
| | | After Exposure to Durability Test Conditions | 38 | 82 | 81 | 84 |
| Ex. 3 | | Initial State | 41 | 84 | 86 | 93 |
| | | After Exposure to Durability Test Conditions | 39 | 81 | 82 | 86 |

Then, a test for measuring a purification performance in a transient state, that is, in such a state that the A/F value has been varied, was conducted by alternately varying the A/F value between A/F=14.5 (stoichiometrical ratio) and A/F=18 (lean) in a cycle of 6 min. In this test, use was made of the same lean burn engine as that used in the above test, and the volume of the catalyst and the position of provision of the catalyst were also the same as those in the above test. The exhaust gas temperature on the inlet side of the catalyst of the engine was 250° C. and 275° C., respectively, for A/F=14.5 and A/F=18. In this case, the throttle angle was full in the case of A/F=14.5, and the manifold load was 400 mmHg in the case of A/F=18. The discharge of NOx on the inlet side of the catalyst and the discharge of NOx after passing through the catalyst were measured with an exhaust gas analyzer, the amount of reduction of NOx was determined from the difference between both the measured discharges, and the amount of reduction was converted by the amount of the gas to determine the NOx purification efficiency. The results are also given in Table 2.

For comparison, comparative catalysts were prepared in the same manner as that of the above-mentioned Example, except that barium and/or lanthanum were not added. The amount of addition of each component is given in Table 1. A performance evaluation test was conducted in the same manner as that of the above-mentioned Example. The results are given in Table 2.

As is apparent from Table 2, the catalyst and method for purifying an exhaust gas according to the present Example can convert NOx, CO and hydrocarbons discharged from a vehicle equipped with a lean burn engine with a high efficiency. Further, from the above results, it is apparent that Ba/La=1/2 mol/mol is particularly preferred.

Further, a test was conducted by alternately varying between the A/F value A/F=14.5 and A/F=18 in a cycle of 10 min (1 min for the former and 9 min for the latter) with the gas temperature at the inlet of the catalyst being kept at 700° C., and this test was continued for 100 hr. After that, the catalytic activity was measured in the same manner as that described above. The results are also given in Table 2. As is apparent from Table 2, the catalyst of the present invention is excellent in the durability.

Further, the structure of the catalyst after the durability test was examined by XRD (X-ray diffraction pattern). As a result, in the comparative catalyst (Sample No. C2) wherein lanthanum alone has been supported, the presence of $LaAlO_3$ was confirmed and the surface area of the carrier was reduced by 60% from the initial value. On the other hand, in the catalyst according to the present Example (Sample Nos. 1, 2 and 3), the amount of $LaAlO_3$ decreased with the increase of the amount of barium supported (sample No. 3→2→1), and no $LaAlO_3$ was formed when Ba/La=1/2. This is believed to suggest that the formation of $BaLa_2O_3$ prevents the formation of $LaAlO_3$ and is reflected also in the activity of the catalyst.

EXAMPLE 2

At the outset, an alumina-coated carrier was prepared in the same manner as that of the Example 1.

Then, the alumina-coated carrier was immersed in an aqueous solution comprising a mixture comprising lanthanum nitrate and barium nitrate in a molar ratio of 2:1 and having a predetermined concentration, dried and calcined at 700° C. for one hour to provide a monolith.

Then, the monolith was immersed in an aqueous dinitrodiamineplatinum nitrate solution having a predetermined concentration, dried and calcined at 300° C. for one hour to provide the catalyst for purifying an exhaust gas according to the present Example.

Then, the resultant catalyst for purifying an exhaust gas was subjected to a performance evaluation test in the same manner as that of the Example 1. The results are given in Table 2.

As is apparent from Table 2, the catalysts for purifying an exhaust gas and the method for purifying an exhaust gas according to the present Example can convert NOx, CO and hydrocarbons discharged from a vehicle equipped with a lean burn engine with a high efficiency. Further, as is apparent from the results of the activity evaluation test after exposure to durability test conditions, the catalysts according to the present Example have an excellent durability.

EXAMPLE 3

At the outset, a lanthanum oxide powder was impregnated with an aqueous barium acetate solution, and the impregnated lanthanum oxide powder was calcined to prepare a mixed oxide powder composed mainly of $BaLa_2O_3$.

Then, 100 parts of an activated alumina powder, the mixed oxide powder prepared above, 100 parts of alumina sol (alumina content: 10% by weight), 30 parts of a 40 wt. % aqueous aluminum nitrate solution and 40 parts of water were stirred and mixed with each other to prepare a slurry.

A previously prepared cordierite monolithic honeycomb carrier was immersed in water and taken out of water, and the excess water was blown off. Thereafter, the carrier was immersed in the slurry as prepared above and taken out of the slurry, and excess slurry was blown off. The coated carrier was dried at 200° C. for 20 min and further calcined at 600° C. for one hour. In the calcined product, the coverage was 130 g per liter of the monolith.

Then, the calculation product was immersed in an aqueous dinitrodiamineplatinum nitrate solution, dried and then calcined at 300° C. for one hour to provide the catalyst for purifying an exhaust gas according to the present Example.

Then, the resultant catalyst for purifying an exhaust gas was subjected to a performance evaluation test in the same manner as that of the Example 1. The results are given in Table 2.

As is apparent from Table 2, the catalysts for purifying an exhaust gas and the method for purifying an exhaust gas according to the present Example can convert NOx, CO and hydrocarbons discharged from a vehicle equipped with a lean burn engine with a high efficiency. Further, as is apparent from the results of the activity evaluation test after exposure to durability test conditions, the catalyst according to the present Example has an excellent durability.

We claim:

1. A method for purifying an oxygen rich exhaust gas simultaneously of, its contents of carbon monoxide, hydrocarbons and nitrogen oxides, comprising:

bring the oxygen rich exhaust gas discharged from an engine into contact with a catalyst for purifying the exhaust gas consisting essentially of (i) at least one porous carrier material selected from the group consisting of alumina, zeolite, zirconia, silica and silica-alumina having applied thereto a combination of (ii) barium oxide and lanthanum oxide, at least a portion of each of the two oxide materials forming a composite barium-lanthanum oxide having the formula $BaLa_2O_4$, and (iii) platinum particles supported on the Ba,La oxide bearing carrier, the composite barium-lanthanum oxide being present in an amount sufficient to suppress the formation of $LaAlO_3$ which forms during operational use of the catalyst, which causes deterioration of the catalyst under the oxygen rich conditions of the exhaust gas treatment and to suppress the grain growth of platinum particles, which grain growth adversely affects the catalyst activity.

2. The method of claim 1, wherein, in the preparation of the exhaust gas purification catalyst, from 0.05 to 10.0 mol/l of a lanthanum compound is mixed with said alumina, zeolite or silica-alumina carrier in order to introduce lanthanum into the catalyst.

3. The method of claim 1, wherein, in the preparation of the exhaust gas purification catalyst, from 0.05 to 10.0 mol/l of a barium compound is mixed with said alumina, zeolite or silica-alumina carrier material in order to introduce barium into the catalyst.

4. The method of claim 1, wherein, in the preparation of the exhaust gas purification catalyst, from 0.05 to 10.0 mol/l of total combined lanthanum compound and barium compound is mixed with the alumina, zeolite or silica-alumina carrier material in order to introduce lanthanum and barium into the catalyst.

5. The method of claim 1, wherein, in the preparation of the exhaust gas purification catalyst, from 0.1 to 10.0 g/l of a platinum compound is mixed with the alumina, zeolite or silica-alumina carrier material in order to introduce Pt into the catalyst.

6. A method for purifying an oxygen rich exhaust gas simultaneously of its contents of carbon monoxide, hydrocarbons and nitrogen oxides, comprising:

bringing the exhaust gas discharged from a lean burning engine in which the air-fuel mixture entering the engine ranges from the stoichiometric air-fuel ratio at idle, through the range of lean burning up to and including the overlean state which is an air/fuel ratio of about 23 which state occurs upon steady running and acceleration of the engine, into contact with a catalyst for purifying the exhaust gas consisting essentially of (i) at least one porous carrier material selected from the group consisting of alumina, zeolite, zirconia, silica and silica-alumina having applied thereto a combination of (ii) barium oxide and lanthanum oxide, at least a portion of each of the two oxide materials forming a composite barium-lanthanum oxide having the formula $BaLa_2O_4$, and (iii) platinum particles supported on the Ba,La oxide bearing carrier, the composite barium-lanthanum oxide being present in an amount sufficient to suppress the formation of $LaAlO_3$ which forms during operational use of the catalyst, which causes deterioration of the catalyst under the oxygen rich exhaust gas atmospheric conditions and to suppress the grain growth of platinum particles, which grain growth adversely affects catalyst activity, and whereby any $NO_x$ produced upon combustion, which is not reduced to $N_2$ under the exhaust gas atmospheric conditions which vary consequently in relation to said range of the air-fuel mixture from the stoichiometric air-fuel ratio to the overlean state, is adsorbed by the composite oxide, which adsorbed $NO_x$, whenever experiencing a reducing state of the exhaust gas over the operational regime of the engine, is reduced to $N_2$ over the Pt of the catalyst.

* * * * *